United States Patent [19]

Falzon et al.

[11] Patent Number: 4,817,313
[45] Date of Patent: Apr. 4, 1989

[54] HUMANE ANIMAL TRAP

[76] Inventors: Alfred Falzon, 78-08 153rd Ave., Howard Beach, N.Y. 11414; Frederich Hoffman, 736 Martha St., Elmont, N.Y. 11003

[21] Appl. No.: 237,835

[22] Filed: Aug. 29, 1988

[51] Int. Cl.⁴ .............................................. A01M 23/26
[52] U.S. Cl. ................................. 43/88; 43/93; 43/94
[58] Field of Search ................ 43/88, 89, 90, 91, 92, 43/93, 94, 95

[56] References Cited

U.S. PATENT DOCUMENTS

| 501,953 | 7/1893 | Martin | 43/90 |
| 973,213 | 10/1910 | Riday | 43/93 |
| 1,107,218 | 8/1914 | Kirk | 43/88 |
| 1,160,622 | 11/1915 | Ledyard | 43/94 |
| 1,456,929 | 5/1923 | Moen | 43/88 |
| 1,871,157 | 8/1932 | Clayton | 43/94 |
| 4,033,067 | 7/1977 | Kuehl | 43/92 |

FOREIGN PATENT DOCUMENTS

| 579055 | 6/1933 | Fed. Rep. of Germany | 43/94 |
| 14367 | of 1908 | United Kingdom | 43/94 |

Primary Examiner—Kurt Rowan
Attorney, Agent, or Firm—Michael I. Kroll

[57] ABSTRACT

A humane animal trap is provided and includes a pair of cushions which can be scented for attracting an animal that are removably attached to inner faces of the trap jaws to prevent injury to jaws of the animal when closed upon the same. A spoon shaped bait-receiving member is also provided so that liquid bait or a solid bait can be used for attracting the animal to trigger the trap.

3 Claims, 2 Drawing Sheets

HUMANE ANIMAL TRAP

BACKGROUND OF THE INVENTION

1. Field of the Invention

The instant invention relates generally to animal traps and more specifically it relates to a humane animal trap.

2. Description of the Prior Art

Numerous animal traps have been provided in prior art that are adapted to catch and in most cases injure or kill the animals. While these units may be suitable for the particular purpose to which they address, they would not be as suitable for the purposes of the present invention as heretofore described.

SUMMARY OF THE INVENTION

A primary object of the present invention is to provide a humane animal trap that will overcome the shortcomings of the prior art devices.

Another object is to provide a humane animal trap that includes a pair of cushions which can be scented for attracting an animal that are removably attached to inner faces of the trap jaws to prevent injury to jaws of the animal when closed upon the same.

An additional object is to provide a humane animal trap that includes a spoon shaped bait-receiving member so that liquid bait or a solid bait can be used for attracting the animal to trigger the trap.

A further object is to provide a humane animal trap that is simple and easy to use.

A still further object is to provide a humane animal trap that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
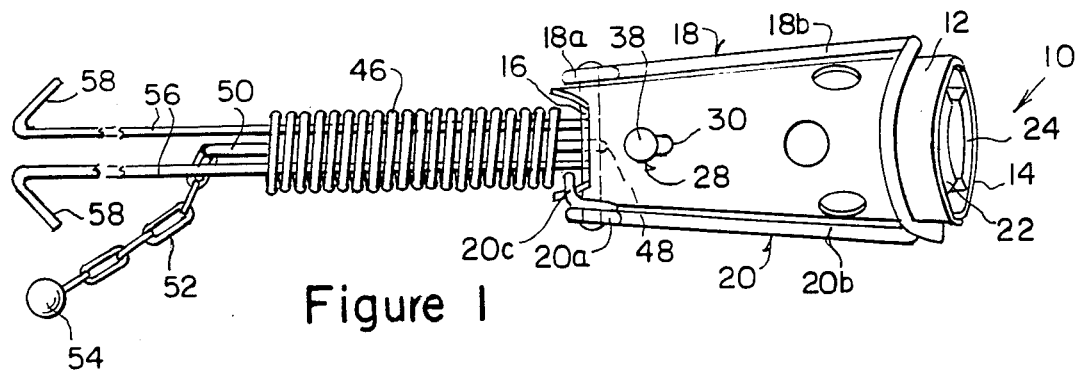
FIG. 1 is a top view of the invention.
Figure 2:
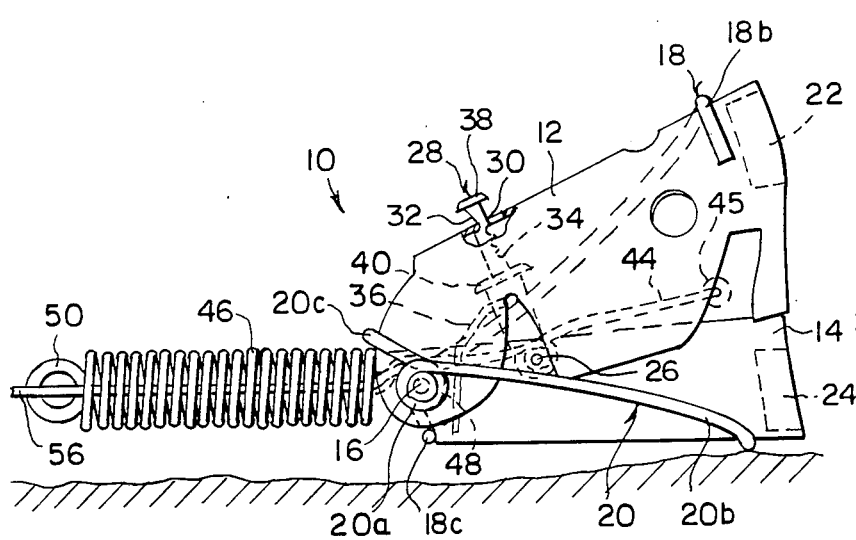
FIG. 2 is a side view showing the trap in an open position.
Figure 3:
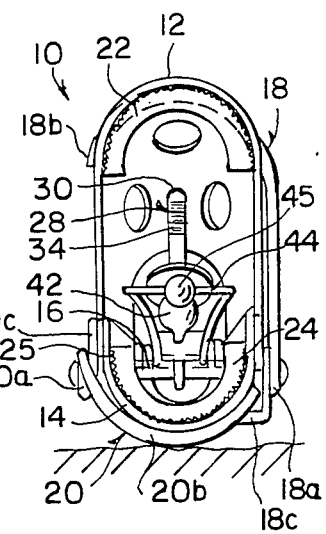
FIG. 3 is an end view thereof.
Figure 4:
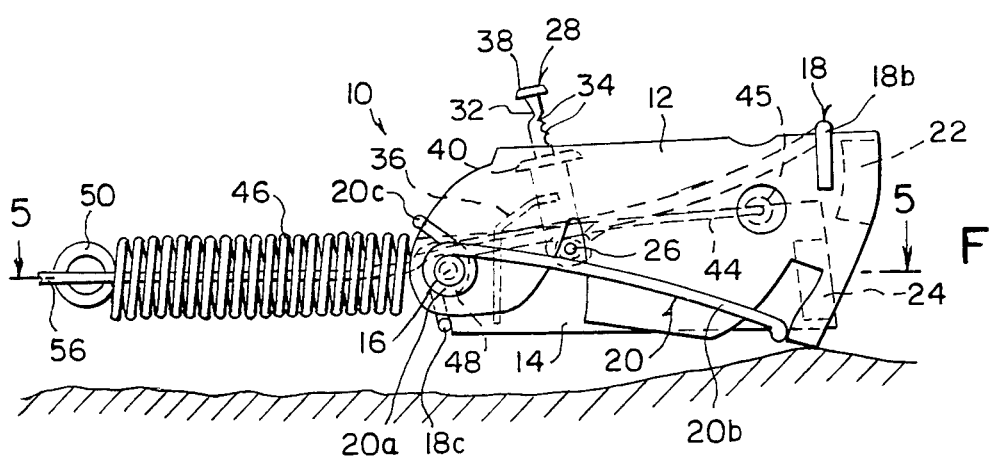
FIG. 4 is a side view showing the trap in a closed position.
Figure 5:
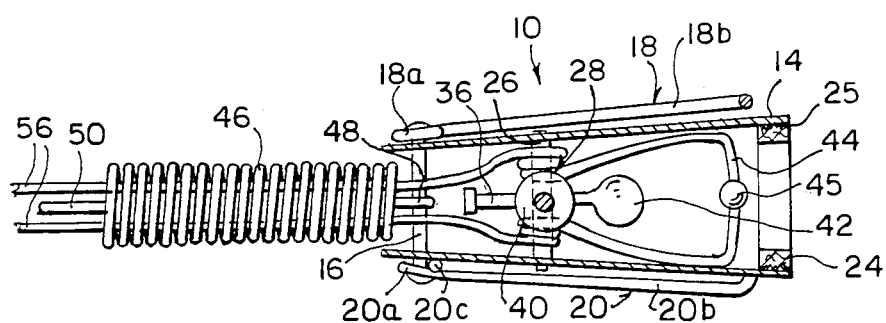
FIG. 5 is a cross sectional view taken along line 5—5 in FIG. 4.
Figure 6:
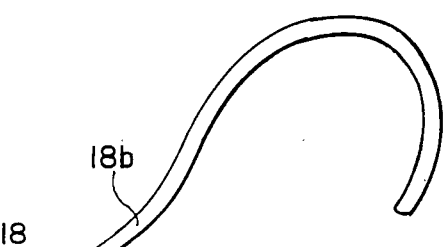
FIG. 6 is a perspective view of the upper spring.
Figure 7:
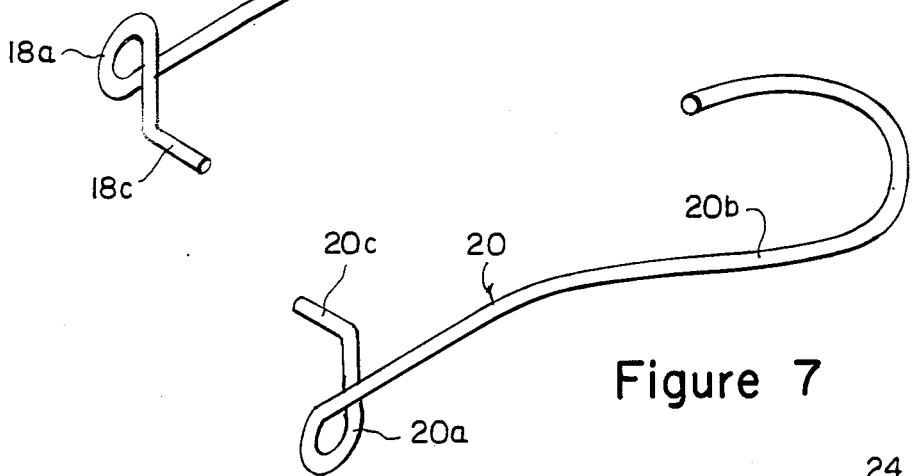
FIG. 7 is a perspective view of the lower spring.

Turning now descriptively to the drawings, in which similar reference characters denote similar elements throughout the several views, the figures illustrate a humane animal trap 10 consisting of a pair of trap jaws movable toward and from each other and includes an upper trap jaw 12 that has a top and side walls and a lower trap jaw 14 that has a bottom and side walls overlapping the side walls of the upper trap jaw 14. A first pivot pin 16 pivotally connects the trap jaws 12 and 14 together while a pair of springs 18 and 20 are disposed on the first pivot pin 16 to move the trap jaws 12 and 14 toward each other.

The upper spring 18 has a loop portion 18a that fits around the first pivot pin 16, a long arm 18b that bears against the upper trap jaw 12 and a short L-shaped arm 18c that bears against the lower trap jaw 14. The lower spring 20 has a loop portion 20a that fits around the first pivot pin 16, a long arm 20b that bears against the lower trap jaw 14 and a short L-shaped arm 20c that bears against the upper trap jaw 12.

A pair of cushions 22 and 24, which can be scented for attracting an animal (not shown) are each removably attached by adhesive 25 or the like, to inner faces of the walls of each of the trap jaws 12 and 14 and being sufficiently smooth, soft and unobstructed to prevent injury to jaws of an animal when closed upon the same.

A second pivot pin 26 is carried by the lower trap jaw 14 while a latch arm 28 is carried by the second pivot pin 26 and extends through an opening 30 in the upper trap jaw 12. The latch arm 28 has a notch 32 on one side thereof adapted to engage the top wall of the upper trap jaw 12 and hold the trap jaws 12 and 14 open against action of the springs 18 and 20 and a series of notches 34 on other side thereof adapted to engage the top wall of the upper trap jaw 12 to prevent opening of the trap jaws 12 and 14. A spring 36 tends to move the series of notches 34 into engagement with the top wall of the upper trap jaw 12.

The top of the latch arm 28 is provided with a head 38 to engage the top wall of the upper trap jaw 12 and limit the movement of the trap jaws 12 and 14 in a direction away from each other. The latch arm 28 is also provided with a shoulder 40 which is adapted to engage underside of the top wall of the upper trap jaw 12 and limit the movement of the trap jaws 12 and 14 toward each other.

A spoon shaped bait-receiving member 42 is connected to the latch arm 28, while a generally C-shaped retaining bar 44 having a ball shaped member 45 formed thereon, is carried by the second pivot pin 26 and is located between the trap jaws 12 and 14 in advance of the spoon shaped bait-receiving member 42 and is adapted to engage and hold front teeth of the animal. The trap jaws 12 and 14 are movable independently of the retaining bar 44 so that when the animal opens its mouth and closes its jaws upon the bait, the latch arm 28 will rock and disengage, causing the trap jaws 12 and 14 to move toward each other, with cushions 22 and 24 bearing against the jaws of the animal for trapping the animal thereto. The bait can be either of the solid or liquid type which may contain a tranquilizer to quiet, not harm the animal.

The humane animal trap 10 further contains a coiled spring 46 that has a hook 48 on one end and a ring 50 on other end in which the hook end 48 is engaged with the first pivot pin 16. A chain 52 has one end attached to the ring end 50 of the coiled spring 46 while other end of the chain 52 is attached to a suitable fixed object 54, such as a stake driven into the ground. A pair of elongated rods 56 are formed as part of the C-shaped retaining bar 44 which extends rearwardly through the coiled spring 46 beyond the ring end 50. Each of the rods 56 has a lateral projection 58 so that when the coiled spring 46 is drawn outwardly from the trap jaws 12 and 14 by a pulling action of the animal, the projections 58 will engage end of the coiled spring 46 and limit outward movement thereof, thus preventing the animal from injuring itself and breaking its teeth upon the retaining bar 44.

Figure 8:
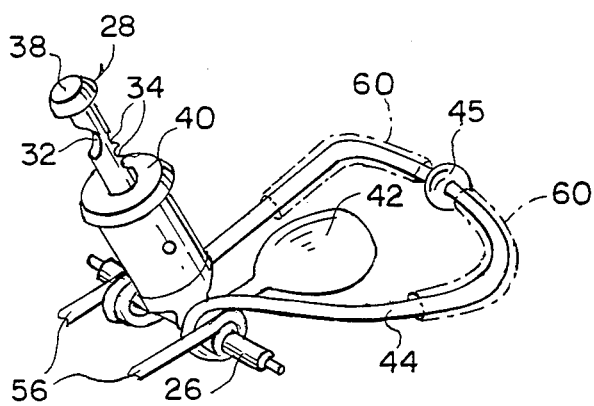
FIG. 8 is a perspective view of the tripping mechanism.
Figure 9:
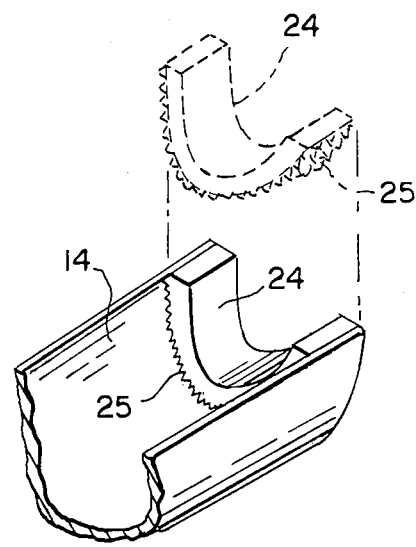
FIG. 9 is a perspective view with parts broken away of the lower jaw with lower cushion therein.

The humane animal trap 10 can further include padding material 60 which can be scented for attracting the animal. The padding material 60 is attached to the retaining bar 44, as shown in FIG. 8 in phantom, for preventing the animal from injuring and breaking its teeth upon the retaining bar 44 when the animal is trapped thereto.

LIST OF REFERENCE NUMBERS 10 humane animal trap
12 upper trap jaw
14 lower trap jaw
16 first pivot pin
18 upper spring
18a loop portion
18b long arm
18c short L-shaped arm
20 lower spring
20a loop portion
20b long arm
20c short L-shaped arm
22 upper cushion
24 lower cushion
25 adhesive or the like
26 second pivot pin
28 latch arm
30 opening in upper trap jaw
32 notch in latch arm
34 notches in latch arm
36 spring for latch arm
38 head on latch arm
40 shoulder on latch arm
42 spoon shaped bait-receiving member
44 C-shaped retaining bar
45 ball shaped member on retaining bar
46 coiled spring
48 hook end
50 ring end
52 chain
54 fixed object
56 elongated rod
58 lateral projection
60 padding for retaining bar It will be understood that each of the elements described above, or two or more together, may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A humane animal trap which comprises:
   (a) a pair of trap jaws movable toward and from each other and including an upper trap jaw having a top and side walls and a lower trap jaw having a bottom and side walls overlapping said side walls of said upper trap jaw;
   (b) a first pivot pin pivotly connecting said trap jaws together;
   (c) a pair of springs disposed on said first pivot pin tending to move said trap jaws toward each other;
   (d) a pair of cushions, which can be scented for attracting an animal, are each removably attached to inner faces of said walls of each of said trap jaws being sufficiently smooth, soft and unobstructed to prevent injury to jaws of an animal when closed upon the same;
   (e) a second pivot pin carried by said lower trap jaw;
   (f) a latch arm carried by said second pivot pin and extending through an opening the said upper trap jaw, said latch arm having a notch on one side thereof adapted to engage said top wall of said upper trap jaw and hold said trap jaws open against action of said springs and a series of notches on other side thereof adapted to engage top surface of said top wall of said upper trap jaw to prevent opening of said trap jaws;
   (g) a spring tending to move said series of notches into engagement with said top wall of said upper trap jaw;
   (g) a spoon shaped bait-receiving member connected to said latch arm; and
   (i) a generally C-shaped retaining bar having a ball shaped member formed thereon, carried by said second pivot pin and located between said trap jaws in advance of said spoon shaped bait-receiving member and adapted to engage and hold front teeth of the animal, said trap jaws being movable independently of said retaining bar, so that when the animal opens its mouth and closes its jaws upon the bait, said latch arm will rock and disengage causing said trap jaws to move toward each other with cushions bearing against the jaws of the animal for trapping the animal thereto.

2. A humane animal trap as recited in claim 1, further comprising:
   (a) a coiled spring having a hook on one end and a ring on other end, said hook end being engaged with said first pivot pin;
   (b) a chain having one end attached to said ring end of said coiled spring while other end of said chain is attached to a suitable fixed object; and
   (c) a pair of elongated rods formed as part of said C-shaped retaining bar which extends rearwardly through said coiled spring beyond said ring end, each of said rods having a lateral projection so that when said coiled spring is drawn outwardly from said trap jaws by a pulling action of the animal said projections will engage end of said coiled spring and limit outward movement thereof, thus preventing the animal from injuring itself and breaking its teeth upon said retaining bar.

3. A humane animal trap as recited in claim 2, further comprising padding material which can be scented for attracting the animal, said padding material attached to said retaining bar for preventing the animal from injuring and breaking its teeth upon said retaining bar when the animal is trapped thereto.

* * * * *